(12) United States Patent
Luschi et al.

(10) Patent No.: US 8,767,668 B2
(45) Date of Patent: Jul. 1, 2014

(54) REPORTING CHANNEL QUALITY INFORMATION

(75) Inventors: Carlo Luschi, Oxford (GB); Tarik Tabet, Bristol (GB)

(73) Assignee: Icera Inc., Wilmington, DE (US)

( * ) Notice: Subject to any disclaimer, the term of this patent is extended or adjusted under 35 U.S.C. 154(b) by 915 days.

(21) Appl. No.: 12/739,587

(22) PCT Filed: Sep. 18, 2008

(86) PCT No.: PCT/EP2008/062460
§ 371 (c)(1),
(2), (4) Date: Jun. 22, 2010

(87) PCT Pub. No.: WO2009/053181
PCT Pub. Date: Apr. 30, 2009

(65) Prior Publication Data
US 2010/0254469 A1 Oct. 7, 2010

(30) Foreign Application Priority Data

Oct. 23, 2007 (GB) .................................. 0720723.6
Oct. 29, 2007 (GB) .................................. 0721188.1

(51) Int. Cl.
*H04W 4/00* (2009.01)
*H04B 7/216* (2006.01)
*H04L 12/28* (2006.01)
*H04J 4/00* (2006.01)

(52) U.S. Cl.
USPC ........... 370/330; 370/252; 370/329; 370/335; 370/436

(58) Field of Classification Search
None
See application file for complete search history.

(56) References Cited

U.S. PATENT DOCUMENTS

| 7,933,195 | B2 | 4/2011 | Kim et al. |
| 8,320,263 | B2* | 11/2012 | Kurose et al. ............... 370/252 |
| 2003/0123559 | A1 | 7/2003 | Classon et al. |
| 2005/0232156 | A1 | 10/2005 | Kim et al. |
| 2007/0032199 | A1* | 2/2007 | Chang et al. ................. 455/69 |
| 2007/0109954 | A1* | 5/2007 | Pasanen et al. ............. 370/204 |
| 2007/0242770 | A1 | 10/2007 | Kim et al. |

FOREIGN PATENT DOCUMENTS

| CN | 1684457 A | 10/2005 |
| CN | 1930801 A | 3/2007 |
| EP | 1533966 A2 | 5/2005 |
| EP | 1564953 A2 | 8/2005 |
| EP | 1898540 A1 | 8/2005 |
| EP | 1635592 A1 | 3/2006 |
| EP | 1761097 A2 | 3/2007 |
| EP | 1821470 A1 | 8/2007 |
| WO | 2007015305 A1 | 2/2007 |
| WO | 2007041845 A1 | 4/2007 |
| WO | 2008030062 A1 | 3/2008 |

OTHER PUBLICATIONS

Cavers; Variable-Rate Transmission for Rayleigh Fading Channels; IEEE, Feb. 1, 1972; 8 pgs.

(Continued)

*Primary Examiner* — Jutai Kao (57) ABSTRACT

A method and corresponding receiver for transmitting channel quality data for a channel in a wireless communication system are provided. The method comprises determining channel quality metrics for frequency intervals within the channel, selecting groups of frequency intervals based on the determined metrics, and transmitting one or more channel quality indicators for the groups. The invention also provides a method of transmitting over a channel based on such channel quality indicators feedback from a receiver, and a corresponding transmitter.

42 Claims, 2 Drawing Sheets

(56) References Cited

OTHER PUBLICATIONS

Steele; Variable Rate QAM for Mobile Radio; IEEE, Jul. 7, 1985; 8 pgs.
Vucetic, An Adaptive Coding Scheme for Time-Varying Channels; IEEE, May 5, 1991; 11 pgs.
Goeckel, Adaptive-Modulation Schemes for Minimum Outage Probability in Wireless Systems; IEEE; Oct. 10, 2004; 4 pgs.
Humblet; Information Capacity and Power Control in Single-Cell Multiuser Communications; IEEE, 1995; 5 pgs.
Nokia; CQI Design and its Impact of DL Performance; Seoul, Korea, Oct. 9-13, 2006; 6 pages.
Huawei; Overhead Reduction of UL CQI Signalling for E-UTRA DL; Cannes, France, Jun. 27-30, 2006; 9 pages.
Panasonic; DCT Partitioning for CQI Reporting; Sorrento, Italy, Jan. 15-19, 2007; 7 pgs.
CN Office Action and Search Report, Application No. 200880123168.4, dated Nov. 2, 2012, 12 pages.
Nokia; CQI Design and its Impact to DL Performance; Malta, St Julian's; Mar. 26-30, 2007; 7 pages.
Motorola; CQI Feedback Scheme for EUTRA; Seoul Korea; Nov. 7-Nov. 11, 2005; 9 pages.
Foreign Communication From a Related Counterpart Application, Japanese Application 2010-530376, Translation of Japanese Office Action dated Feb. 26, 2013, 21 pages.

\* cited by examiner

REPORTING CHANNEL QUALITY INFORMATION

CROSS REFERENCE TO RELATED APPLICATION

This application is the National Stage of, and therefore claims the benefit of International Application No. PCT/EP2008/062460 filed on Sep. 18, 2008, entitled "REPORTING CHANNEL QUALITY INFORMATION," which was published in English under International Publication Number WO 2009/053181 on Apr. 30, 2009, and has priority based on GB 0720723.6 filed on Oct. 23, 2007, and on GB 0721188.1 filed on Oct. 29, 2007. Each of the above applications is commonly assigned with this National Stage application and is incorporated herein by reference in their entirety.

TECHNICAL FIELD

The application is directed, in general, to reporting Channel Quality Information in wireless systems, for example cellular wireless systems.

BACKGROUND

Link adaptation by means of adaptive modulation and coding enables robust and spectrally efficient transmission over time-varying channels in a wireless system. The basic idea behind it is to estimate the channel at a receiver and feed this estimate back to a transmitter. The latter adjusts its transmission in order to adapt the modulation scheme and the code rate to the channel characteristics. Modulation and coding schemes that do not adapt to fading conditions require a fixed link margin to support an acceptable performance when the channel quality is poor. These systems are then designed for the worst-case channel conditions, and result in an inefficient use of the channel. Thus, adaptive modulation and coding schemes are appealing, since they can increase the average throughput, and reduce the required transmit power and bit error rate. See, for example: "Variable-Rate Transmission for Rayleigh Fading Channels" by J. K. Cavers (IEEE Transactions on Communications, pp. 15-22, February 1972); "Variable Rate QAM for Mobile Radio" by W. T. Webb and R. Steele (IEEE Transactions on Communications, pp. 2223-2230, July 1995); "An Adaptive Coding Scheme for Time-Varying Channels" by B. Vucetic (IEEE Transactions on Communications, pp. 653-663, May 1991); and "Adaptive-Modulation Schemes for Minimum Outage Probability in Wireless Systems" by K. M. Kamath and D. L. Goeckel (IEEE Transactions on Communications, pp. 1632-1635, October 2004).

Moreover, a radio channel is always subject to some degree of frequency selectivity, implying that the channel quality will vary in the frequency domain. This variation in frequency can be beneficial for a link adaptation scheme over the frequency axis for multi-carrier systems such as OFDM systems. With adaptive modulation and coding in the frequency domain, a higher-order modulation (e.g. 16QAM or 64QAM) together with a high code rate is appropriate for frequency intervals (e.g., subcarriers or groups of sub-carriers) experiencing advantageous channel conditions in the frequency domain, where QPSK modulation and low-rate coding are used for frequency intervals with poor radio link conditions.

The advantages of adaptive modulation and coding have motivated its use in advanced wireless communication systems, including cellular systems like EGPRS and HSPA as well as wireless LANs.

Figure 1:
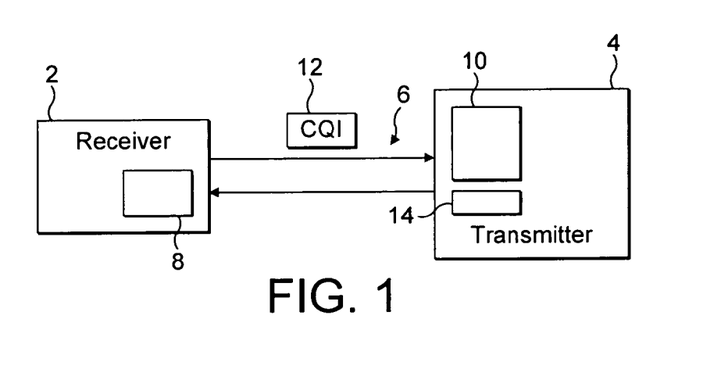
FIG. 1 is a schematic block diagram of a receiver and a transmitter in a wireless communications system.

FIG. 1 is a schematic diagram of a receiver 2 communicating with a transmitter 4 via a wireless channel 6. The transmitter and receiver can be a base station (or Node-B) and a mobile terminal (or user equipment (UE)), adapted for use in a wireless cellular environment. The receiver 2 has a processor 8 for, amongst other things, estimating the channel quality and providing a channel quality indicator (CQI) value. The transmitter includes a processor 10 for, amongst other things, implementing adaptive modulation and coding based on CQIs it receives from the receiver. It will readily be appreciated that FIG. 1 is greatly simplified—in practice there can be a plurality of receivers and transmitters, with a multiplicity of channels, which vary in quality with time and in the frequency domain.

Another appealing scheme that maximizes the spectral efficiency of a wireless system is channel-dependent scheduling implemented by a packet scheduler 14. This mechanism controls the allocation of the shared resources (e.g. frequency intervals for multi-carrier system like OFDM) at each instant. It is closely related to adaptive modulation and coding scheme and often they are seen as one joint function as they are both trying to adapt to the channel conditions. The first objective of downlink scheduling, for example, is to make the users orthogonal by different multiplexing techniques: Time Division Multiplexing, Frequency Division Multiplexing, Code Division Multiplexing or Spatial Division Multiplexing. The second objective is the maximization of the radio resources. When transmissions to multiple users occur in parallel, resources (in code/frequency/time/space domain) are assigned to users with the best instantaneous channel conditions. See, for example "Information Capacity and Power Control in Single-Cell Multiuser Communications" by R. Knopp and P. A. Humblet (Proceedings of IEEE International Conference on Communications, vol. 1, Seattle, USA, June 1995, pp. 331-335). This strategy is an example of channel dependent opportunistic scheduling, where the scheduler takes into account only the instantaneous radio-link conditions. Other strategies can take into account delay, fairness—in general parameters related to QoS constraints.

To enable adaptive modulation and coding and channel-dependent opportunistic scheduling, the mobile terminal or User Equipment (UE) reports a Channel Quality Indicator (CQI) 12. In an OFDM system, to support downlink scheduling in the frequency domain coupled with a link adaptation scheme with a plurality of users, each user needs to report a CQI per frequency interval (group of sub-carriers) and over time. In order to provide full flexibility at the packet scheduler 14, the UE 2 would need to report CQIs 12 over the entire frequency band, making the signaling overhead impractically large.

Figure 2:
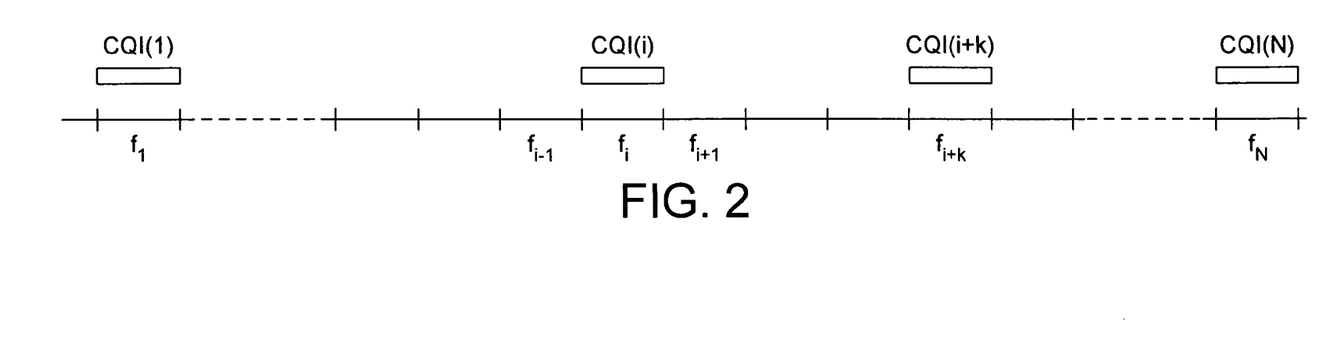
FIG. 2 is a schematic diagram showing reported CQIs and frequency intervals.

FIG. 2 is a schematic diagram of a frequency band with consecutive frequency intervals $f_1, \ldots, f_N$ at respective frequency locations $i=1, \ldots, N$. Each frequency interval corresponds for instance to a predefined number of adjacent OFDM sub-carriers.

Many solutions have been proposed for CQI feedback reduction, to allow frequency selective scheduling with reduced signaling overhead. These solutions range from uniform reporting grid of CQI, where a CQI $(CQI(1), \ldots, CQI(N))$ is reported for each frequency interval $f_1, \ldots, f_N$ (impractical from the point of view of the implementation complexity), to reporting only the indication of the best CQI and the best frequency interval (e.g. $CQI(i)$ for interval $f_i$). The latter scheme is based on the fact that a user will be preferentially scheduled on its best frequency interval, and therefore the CQI for the best resource block is of primary interest to the scheduler 14. A variation of the latter scheme is to report the CQIs for the M best frequency intervals, e.g. CQI(1), CQI(j), CQI(i+k) for $f_1$, $f_i$ and $f_{i+k}$ (M=3). Another possibility is to adopt a threshold-based CQI report, based on the feedback of the average CQI over the frequency intervals that are within a predefined threshold from the best CQI. Other solutions aim at reducing the overhead of CQI feedback by reporting an average CQI over the M best frequency intervals, or over the frequency intervals that are within a predefined threshold from the best CQI. On top of these schemes, it has been proposed to apply some known compression methods such as Discrete Cosine Transform or Wavelet Transform to further reduce the number of bits required to encode the CQI reports.

The main disadvantages of these schemes are:

Lack of scheduling flexibility—For different reasons such as system overload, scheduling type or practical reasons, the packet scheduler may need to assign to the users different frequency intervals than the one reported. The CQI schemes reported above do not provide channel quality information for other than the reported frequency intervals.

In the case of feedback of averaged CQIs, reporting averaged channel quality may destroy channel information. Depending on channel variability in frequency and/or time, the averaging could destroy the information about the channel condition at specific frequencies.

Signaling overhead—The schemes mentioned above need to report the index i of frequency intervals to which the reported CQIs are referred.

SUMMARY

To address the above-discussed deficiencies of the prior art, in one embodiment, there is provided

BRIEF DESCRIPTION

Reference is now made to the following descriptions taken in conjunction with the accompanying drawings, in which.

DETAILED DESCRIPTION

Those skilled in the art to which this application relates will appreciate that other and further additions, deletions, substitutions and modifications may be made to the described embodiments.

According to one aspect of the present invention, there is provided a method of transmitting channel quality data for channels in a wireless communication system, the method comprising:

determining a plurality of metrics, each based on channel quality information of a respective one of a plurality of frequency intervals at respective frequency locations within the channel;

selecting a plurality M of frequency intervals based on said metrics;

determining M exclusive groups of K+1 frequency intervals, each group consisting of a respective one of the frequency intervals corresponding to the M frequency intervals and K frequency intervals immediately around the M frequency intervals;

transmitting the frequency locations of the M frequency intervals; and transmitting the same channel quality indicator for the M groups of K+1 frequency intervals.

According to another aspect of the present invention, there is provided a method of transmitting channel quality data for channels in a wireless communication system, the method comprising:

determining a plurality of metrics, each based on channel quality information of a respective one of a plurality of frequency intervals;

selecting a plurality M of frequency intervals based on said metrics;

transmitting the frequency locations of the M frequency intervals; and transmitting the same channel quality indicator for the 3M frequency intervals consisting of the M frequency intervals and the 2M frequency intervals adjacent to those of the M frequency intervals.

According to another aspect of the present invention there is provided a method of transmitting channel quality data for channels in a wireless communication system, the method comprising:

determining a plurality of metrics, each based on channel quality information of a respective one of a plurality of frequency intervals at respective frequency locations within the channel;

selecting a plurality M of frequency intervals based on said metrics;

determining a set K of frequency intervals each within a specified number of frequency locations from the frequency interval of one of said M frequency intervals;

transmitting the frequency locations of the M frequency intervals; and transmitting the same channel quality indicator for the M+K frequency intervals consisting of the M frequency intervals and the frequency intervals of the set of K frequency intervals.

According to another aspect of the present invention, there is provided a method of transmitting channel quality data for channels in a wireless communication system, the method comprising:

determining a plurality of metrics, each corresponding to a respective one of a plurality of frequency intervals;

selecting a plurality M of frequency intervals in dependence on the determined metric for each interval; and transmitting the frequency locations of the M frequency intervals; and transmitting the same channel quality indicator for each of the M frequency intervals.

According to another aspect of the present invention, there is provided a method of transmitting channel quality data for channels in a wireless communication system, the method comprising:

determining a respective channel quality metric for each of a plurality of frequency intervals at respective frequency locations within the channel;

in dependence on the determined channel quality metrics, forming a plurality M of preferred exclusive groups each of K adjacent frequency intervals;

transmitting the frequency locations of the M preferred groups transmitting the same channel quality indicator for the frequency intervals of the M groups.

In embodiments, the method may further comprise transmitting an indicator indicating whether the transmitted channel quality information is to be used for scheduling frequency intervals adjacent to the frequency intervals of the M preferred channel indicators.

In embodiments, K may be based on the determined metrics. K may be based on a predetermined estimate of correlation between frequency intervals. K may be based on criteria based on average measures of the correlation between frequency intervals under specific channel conditions.

In embodiments, the method may further comprise estimating a correlation between frequency intervals based on channel conditions, and selecting K in dependence on said correlation.

According to another aspect of the present invention, there is provided a method for scheduling transmission in a wireless communication system, comprising:

receiving channel quality indicator information for selected frequency intervals; and scheduling transmission in at least one other frequency interval in dependence on the channel quality indicator information for the selected frequency intervals.

In embodiments, the selected frequency intervals are the M preferred intervals based on a selection criterion. The selection criterion may comprise the selection of M frequency intervals having the highest channel quality indicator values.

In embodiments, the at least one other frequency interval is an interval adjacent to a selected frequency interval.

In embodiments, the method may further comprise: transmitting averaged channel quality indicator information for the system bandwidth or for the bandwidth of operation.

In embodiments, the method may further comprise:

differentially encoding said same channel quality indicator information relative to said averaged channel quality indicator information for the system bandwidth or for the bandwidth of operation; and transmitting said same channel quality indicator information in differentially encoded form.

According to another aspect of the present invention, there is provided a method of transmitting in a wireless communication system using channel quality data fed back from a receiver, the method comprising:

transmitting a signal to the receiver over a wireless channel comprising a plurality of frequency intervals at respective frequency locations;

receiving the locations of preferred exclusive groups of frequency intervals, the frequency intervals of each group being within a predetermined number of frequency locations of one another, the locations being transmitted back from the receiver based on said signal as received over said channel;

receiving the same channel quality indicator for said groups, the channel quality indicator being transmitted back from the receiver based on said signal as received over said channel;

utilizing said same channel quality indicator to schedule subsequent transmission on the plurality of frequency intervals within said groups.

According to another aspect of the present invention, there is provided a transmitter for use in a wireless communication system, the transmitter comprising:

transmission means for transmitting a signal to the receiver over a wireless channel comprising a plurality of frequency intervals at respective frequency locations; and receiving means for receiving the locations of preferred exclusive groups of frequency intervals, the frequency intervals of each group being within a predetermined number of frequency locations of one another, and for receiving the same channel quality indicator for said groups, the locations and the channel quality indicator being transmitted back from the receiver based on said transmission;

scheduling means configured to utilize said same channel quality indicator to schedule subsequent transmission on the frequency intervals of said groups.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel, there being a total number of frequency intervals and corresponding channel quality indicators for the channel;

selecting a plurality M of preferred channel quality indicators;

transmitting the frequency locations of the preferred M channel quality indicators; and transmitting averaged channel quality indicator information, the averaged information being based on the preferred M channel quality indicators and on additional channel quality indicators each corresponding to a frequency interval within a specified number of frequency locations from the frequency interval of one of said M preferred channel quality indicators, but based on fewer than the total number of channel quality indicators.

By transmitting information about the best M frequency intervals along with additional information about frequency intervals nearby the best M frequency, including transmitting averaged channel quality indicator information and frequency locations of the best M intervals, then estimated channel quality indicators can be reconstructed again from the received information without the need to transmit the actual channel quality indicator for each individual frequency interval. This works because the nearby frequency intervals can be assumed to be correlated with the best frequency intervals to which they are nearby, and thus can be estimated to have approximately the same channel quality indicator. The present invention thus advantageously exploits the channel quality indicator correlation in the frequency domain, and so allows feedback of channel quality information with a very low signalling overhead by reducing the need to transmit additional individual channel quality indicators and their frequency locations, thereby providing additional scheduling opportunities at minimal cost.

This approach can be extended to the case where the M selected frequency intervals or M best frequency interval are not the best in the sense of corresponding to the highest CQI values, but are the preferred ones based on a specific selection criterion. Thus in the following description reference to 'best' can be understood as an embodiment, the more general requirement being for a selection of M preferred frequency intervals.

The specified number of frequency intervals nearby the M selected frequency intervals may be predetermined based on the system design. Alternatively, the specified number of frequency intervals nearby the M selected frequency intervals could be selected dynamically by the user equipment or by the base station/network in dependence on an estimate of correlation calculated based on channel conditions. This clearly includes a selection based on the measured or reported CQI values.

The specific combinations of channel quality information transmitted in the above schemes have been found to be particularly effective, in terms of providing an optimised balance between overhead and system performance.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

for each of the 2M frequency intervals adjacent to those of the M preferred channel quality indicators, generating slope data relating the channel quality indicator of that adjacent frequency interval to its respective preferred frequency interval;

transmitting the frequency locations of the M preferred channel quality indicators;

transmitting an average of the M preferred channel quality indicators; and transmitting an average of the slope data for the 2M adjacent frequency intervals.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

transmitting the frequency locations of the M preferred channel quality indicators; transmitting an average of the M preferred channel quality indicators; and transmitting an average of the 2M channel quality indicators adjacent to those of the M preferred channel indicators.

In an aspect the invention provides a method of transmitting channel quality data for channels in a wireless communication system, the method comprising:

determining a plurality of channel quality indicators, each corresponding to a respective one of a plurality of frequency intervals;

selecting a plurality M of preferred channel quality indicators;

transmitting the frequency locations of the M preferred channel quality indicators; and transmitting an average of the 3M channel quality indicators consisting of the M preferred channel quality indicators and the 2M channel quality indicators of the frequency intervals adjacent to those of the M preferred channel indicators.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining M exclusive groups of K+1 frequency intervals, each group consisting of a respective one of the frequency intervals corresponding to the M preferred channel quality indicators and K frequency intervals immediately around those of the M preferred channel indicators;

transmitting the frequency locations of the M preferred channel quality indicators; and transmitting M averages, each being an average of the channel quality indicators of the K+1 frequency intervals of a respective one of said M groups.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining the two frequency intervals having the highest and lowest frequency locations of those corresponding to the M preferred channel quality indicators;

transmitting said highest and lowest frequency locations; and transmitting an average of the channel quality indicators of all the frequency intervals between those of the highest and lowest frequency locations inclusive.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining the two frequency intervals having the highest and lowest frequency locations of those corresponding to the M preferred channel quality indicators;

transmitting the frequency locations of the M preferred channel quality indicators; and transmitting an average of the channel quality indicators of all the frequency intervals between those of the highest and lowest frequency locations inclusive.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining the two frequency intervals having the highest and lowest frequency locations of those corresponding to the M preferred channel quality indicators;

transmitting the frequency locations of the M preferred channel quality indicators;

transmitting an average of the M preferred channel quality indicators; and transmitting an average of the channel quality indicators of all the frequency intervals between those of the highest and lowest frequency locations excluding the M preferred channel quality indicators.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining a set K of frequency intervals each within a specified number of frequency locations from the frequency interval of one of said M preferred channel quality indicators;

transmitting the frequency locations of the M preferred channel quality indicators; and transmitting an average of the M+K channel quality indicators consisting of the M preferred channel quality indicators and the channel quality indicators of the set of K frequency intervals.

In an aspect the invention provides a method of transmitting channel quality data for channels in a wireless communication system, the method comprising:

determining a plurality of channel quality indicators, each corresponding to a respective one of a plurality of frequency intervals at respective frequency locations within the channel;

selecting a plurality M of preferred channel quality indicators;

determining a set K of frequency intervals each within a specified number of frequency locations from the frequency interval of one of said M preferred channel quality indicators;

transmitting the frequency locations of the M preferred channel quality indicators;

transmitting an average of the M preferred channel quality indicators; and transmitting an average of the channel quality indicators of the set of K frequency intervals.

In an aspect the invention provides a method of transmitting channel quality data for channels in a wireless communication system, the method comprising:

determining a plurality of channel quality indicators, each corresponding to a respective one of a plurality of frequency intervals;

selecting a plurality M of preferred channel quality indicators;

transmitting the frequency locations of the M preferred channel quality indicators;

transmitting an average of the 3M channel quality indicators consisting of the M preferred channel quality indicators and the 2M channel quality indicators of the frequency intervals adjacent to those of the M preferred channel indicators;

transmitting a bit indicating whether more than half of said 3M channel quality indicators are higher than said average.

In an aspect the invention provides a method of transmitting channel quality data for channels in a wireless communication system, the method comprising:

determining a plurality of channel quality indicators, each corresponding to a respective one of a plurality of frequency intervals;

selecting a plurality M of preferred channel quality indicators;

transmitting the frequency locations of the M preferred channel quality indicators;

transmitting an average of the M preferred channel quality indicators; and transmitting a bit indicating whether more than half of the M preferred channel quality indicators are higher than said average.

In an aspect the invention provides a method of transmitting channel quality data for channels in a wireless communication system, the method comprising:

determining a plurality of channel quality indicators, each corresponding to a respective one of a plurality of frequency intervals;

selecting a plurality M of preferred channel quality indicators;

transmitting the frequency locations of the M preferred channel quality indicators;

transmitting an average of the 3M channel quality indicators consisting of the M preferred channel quality indicators and the 2M channel quality indicators of the frequency intervals adjacent to those of the M preferred channel indicators; and transmitting a bit indicating whether the average of the M preferred channel quality indicators differs from the average of said 2M channel quality indicators by greater than a specified amount.

According to another aspect of the present invention, there is provided a method of receiving the M frequency locations and the averaged information and reconstructing the relevant channel quality indicators accordingly.

According to further aspects of the present invention, there is provided an apparatus for transmitting the locations and averaged information, and an apparatus for receiving the locations and averaged information and reconstructing the relevant channel quality indicators.

According to another aspect of the present invention, there is provided a computer program product, the program comprising code which when executed by a processor performs the steps of outputting the M frequency locations and the averaged information for transmission. According to another aspect of the present invention, there is provided a computer program product, the program comprising code which when executed by a processor performs the steps of inputting the M frequency locations and the averaged information and reconstructing the relevant channel quality indicators accordingly.

The following described embodiments of the invention provide schemes for CQI reporting, which aim to decrease the required signaling overhead and to increase the robustness and performance of the system. In addition to reporting the CQI of the M best frequency intervals of the radio frequency band available for transmission, the proposed schemes report information which the packet scheduler can use in order to reconstruct the CQI of frequency intervals adjacent to the M best ones. Depending on the channel selectivity, adjacent frequency intervals experience correlated channel conditions. This information is not taken into account by the prior art schemes described above but is exploited here. As a result, the scheduler is provided with more freedom in opportunistic scheduling of the users in the frequency domain.

The following described embodiments of the invention rely on the use of the local information of the channel around a particular frequency interval, in order to reconstruct the channel quality indicator over adjacent frequency intervals.

Figure 3:
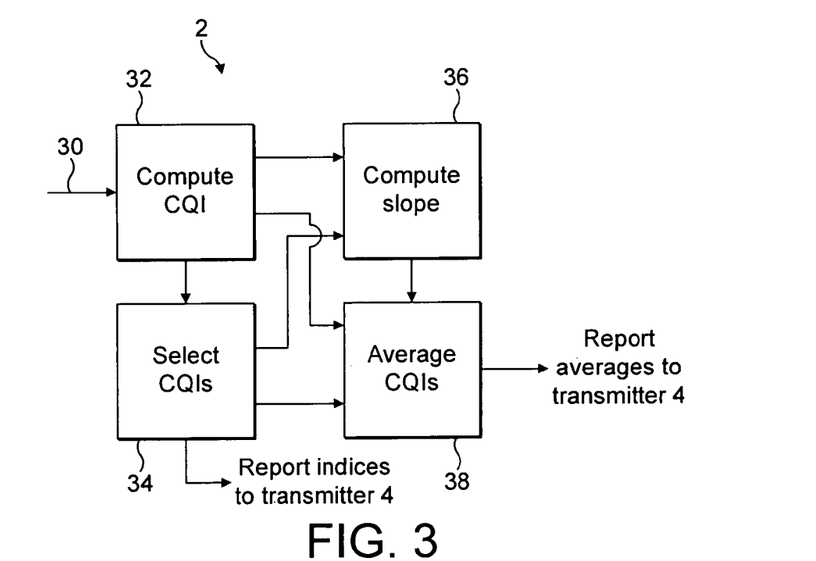
FIG. 3 is a schematic block diagram of a receiver in accordance with one embodiment of the invention.

FIG. 3 is a schematic block diagram of components of a receiver for transmitting channel quality information in accordance with embodiments of the invention. FIG. 3 is schematic only and is drawn in the form of functional blocks. In practice, these components will be implemented by a suitably programmed processor. The receiver 2 comprises a CQI computation block 32, a CQI selection block 34, and an average calculation block 38. In the first embodiment described below, the receiver 2 also comprises a slope calculation block 36.

The CQI computation block 32 computes the CQIs from incoming channel related parameters 30 (e.g., from a measure of the signal-to-interference plus noise power ratio on each frequency interval) for all frequency intervals of the radio bandwidth available for transmission. The CQI selection block 34 selects one or more values of CQI as being the preferred CQIs according to a specific selection criterion. The criterion may select the best CQIs. Typically more than one CQI is determined as preferred and when there are M CQIs these are referred to as the M preferred CQI. The frequency index i associated with each of the M preferred CQIs is also determined. The average calculation block 38 calculates an average CQI value or values based on the selected M preferred intervals, and on additional nearby intervals which are each within a specified number of frequency locations from one of the M preferred (not necessarily all from the same one of the M preferred). For example, the nearby intervals could be only the two adjacent frequency intervals either side (left and right) of the M preferred, or could be groups each made up of a certain number of intervals either side of the M preferred (the groups could be different sizes but would preferably each be of the same size). The averaged information is based on only these M preferred and additional nearby intervals, so it is based on fewer than the total frequency intervals of the channel in question. The receiver 2 reports (i.e. transmits) channel quality information, including the frequency indices of the M preferred intervals and the average or averages, to the transmitter 4 for use by the scheduler 14.

Figure 5:
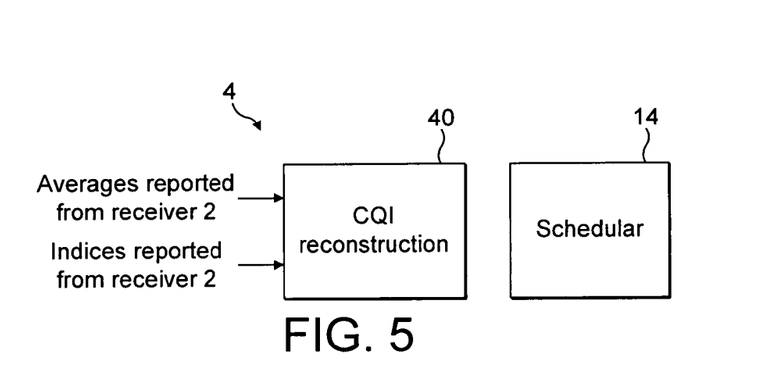
FIG. 5 is a schematic block diagram showing a transmitter in accordance with one embodiment of the invention.

FIG. 5 is a schematic diagram of functional blocks located at a transmitter where a CQI reconstruction block 40 receives the indices of the M preferred frequency intervals, together with the averages of selected frequency locations. Depending on the nature of the information received, the CQI reconstruction block 40 reconstructs the CQIs for each of the M preferred frequency intervals and the required additional frequency intervals nearby the reported best intervals. The reconstruction relies on estimating that certain frequency intervals are suitably correlated such that they can be taken to have the same CQIs. Examples of such estimates are outlined in relation to the embodiments discussed below. The reconstructed CQI together with the frequency interval indices are supplied to the packet scheduler 14.

For a given system such as 3GPP LTE, it is possible to identify that the correlation between groups of OFDMA subcarriers (or in general frequency intervals) will mainly depend on the propagation channel profile.

A designer may pre-select a certain fixed range of frequency intervals either side of each of the M preferred from which to take the additional nearby intervals to include in the averaged information. This amounts to assuming that the CQIs of a certain number of frequency intervals either side of each of the M preferred intervals are suitably correlated to be reconstructed again from an average. Alternatively for example, the UE may estimate the signal-to-interference ratio (SIR) of each frequency interval, and thus estimate the correlation of the CQI between intervals in order to make an "ad-hoc" selection of the number of nearby intervals' CQIs to include in the averaged report. For instance in the case of adjacent frequency intervals, this will allow the report to adapt to different realizations of the downlink channel, which is generally not known to the base station/network.

A first embodiment of the present invention is now described. One type of information which can be used for the reconstruction of the CQI on adjacent frequency intervals is the slope or any variation of the slope of CQI over frequency as it will be illustrated in detail in the description of the various embodiments. Reporting the slope of the CQI of adjacent frequency intervals requires a reduced amount of information compared to the transmission of the full CQI value for adjacent frequency intervals. Moreover, since the slope data concerns adjacent frequency intervals, their indices do not need to be reported, which results in an additional saving in terms of signaling overhead.

Figure 4:
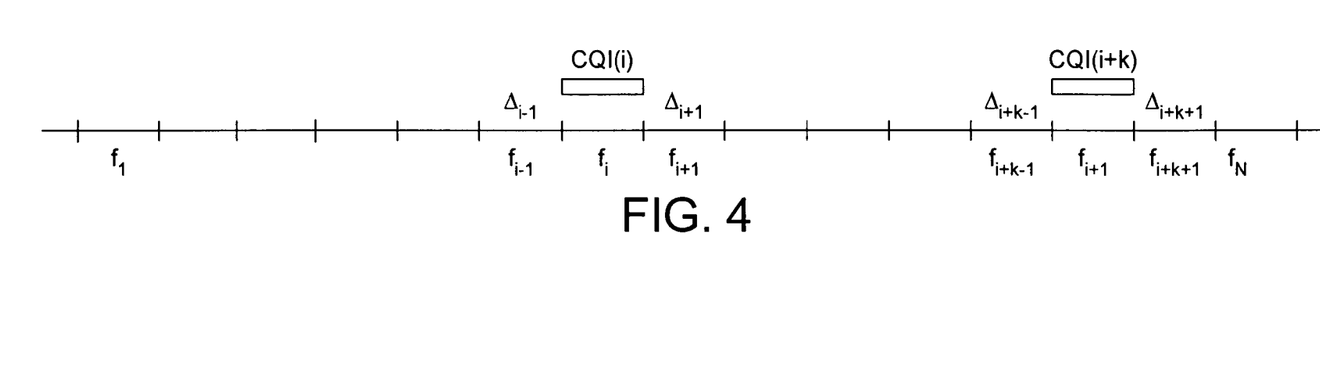
FIG. 4 is a schematic diagram showing reported CQI and slope data with corresponding frequency intervals.

A compute slope block 36 receives the M preferred CQIs and computes the slope for the two adjacent frequency intervals either side of each of the M preferred CQIs. This is illustrated more clearly in FIG. 4, which shows 2 preferred CQIs, CQI(i) and CQI(i+k), but in practice there could be several (equal to M). FIG. 4 also shows the slopes Δ either side of each of the selected preferred frequency intervals. Each slope Δ relates the CQI of the adjacent frequency interval in question to the CQI of the selected preferred frequency interval to which it is adjacent. It is preferably a measure of the gradient between the CQI of the adjacent frequency interval in question to the CQI of the selected preferred frequency interval to which it is adjacent. This gradient is proportional to the difference between the CQI of the selected preferred frequency interval and the CQI of its adjacent frequency interval.

The receiver 2 thus does not need to report the CQIs of the frequency intervals for the 2M extra adjacent frequency intervals, not their indices i−1, i+1; and i+k−1, i+k+1. Instead, in the first embodiment, the receiver 2 need only determine the slope data for both the left and right adjacent frequency intervals of each of the preferred M frequency intervals, and determine and report: the frequency locations (indices) for the M preferred frequency intervals, an average of the 2M slopes, and a separate average of the M CQIs of the M preferred frequency intervals.

In this case, the scheduler 14 at the transmitter 4 (FIG. 1) has 3M frequency intervals available for scheduling. The reconstruction block 40 reconstructs the CQIs of the 3M intervals by estimating that the M preferred frequency intervals all have the same average CQI as reported by the receiver 2, and by estimating that the 2M adjacent intervals all have the same lesser CQI which is reconstructed from the average slope and the average CQI of the M preferred intervals.

Note, the selection block 32 preferably avoids selecting the M preferred intervals such that there is only one interval between any of them, i.e. so that the right adjacent interval of one preferred interval is the same as the left adjacent interval of another preferred interval. (This may also apply in other embodiments where intervals adjacent to or around the M preferred are used).

In a second embodiment, the slope data is not used. Instead, the receiver 2 reports only: the frequency locations for the M preferred frequency intervals, an average of the M CQIs of the M preferred frequency intervals and a separate average of the 2M CQIs of the 2M adjacent frequency intervals. The scheduler 14 of the transmitter 4 thus again has 3M frequency intervals available for scheduling. But this time, the reconstruction block 40 reconstructs the CQIs of the 3M intervals by estimating that the M preferred frequency intervals all have the same CQI, this being the average as reported by the receiver 2; and by estimating that the 2M adjacent intervals all have the same lesser CQI, as also reported as a separate average by the receiver 2.

In the second embodiment, the average CQI values may optionally be differentially encoded. That is, the average CQI of one group of frequency intervals may be transmitted as a difference with respect to the average CQI of the other group of frequency intervals.

In a third embodiment the receiver 2 reports only: the frequency locations for the M preferred frequency intervals, and a combined average of the 3M CQIs of the M preferred frequency intervals and the 2M adjacent frequency intervals. The reconstruction block 40 then reconstructs the CQIs of the 3M intervals by estimating that the M preferred frequency intervals and their 2M adjacent intervals all have the same CQI, this being the average reported by the receiver 2.

In a fourth embodiment, the receiver determines M exclusive groups of K+1 frequency intervals, each group containing one of the M preferred frequency intervals and K frequency intervals immediately around it (within a specified number of frequency locations). The receiver reports only the frequency locations for the M preferred frequency intervals along with M average values, each average value being the average of the CQIs of the respective group of K+1 frequency intervals. The scheduler 14 then has M(K+1) intervals available for scheduling. The reconstruction block 40 estimates that each interval with a given group of K+1 has the same CQI, this being the average reported by the receiver 2.

In the fourth embodiment, the average CQI values may optionally be differentially encoded. That is, the average CQI of one or more groups may be transmitted as a difference in relation to the average CQI of another group, for example as the gradient between successive groups (this differential is similar to the slope data of the first embodiment, but with respect to groups of frequency intervals instead of individual frequency intervals).

In a fifth embodiment, the receiver 2 reports only: the frequency locations of the most left and most right of the M preferred frequency intervals, and an average CQI of all frequency intervals from the most left of the M preferred intervals to the most right. The reconstruction block 40 then estimates that each interval in that range has the same CQI, this being the average reported by the receiver 2. This works preferred if the M preferred intervals are relatively close to one another.

In a sixth embodiment the receiver 2 reports only: the frequency locations of the M preferred frequency intervals and an average CQI of all frequency intervals from the most left frequency interval of the M preferred intervals to the most right. The reconstruction block 40 then estimates that each interval in that range has the same CQI, this being the average reported by the receiver 2. Again, this works preferred if the M preferred intervals are relatively close to one another.

In a seventh embodiment, the receiver 2 reports only: the frequency locations of the M preferred frequency intervals, an average CQI of the M preferred frequency intervals, and an average CQI of a set of frequency intervals composed of all frequency intervals from the most left frequency interval of the M preferred intervals to the most right except the M preferred frequency intervals. The reconstruction block 40 then reconstructs the CQIs by estimating that the preferred M frequency intervals all have the same CQI, this being the average as reported by the receiver 2; and by estimating that the set of other intervals all have the same lesser CQI, as also reported as a separate average by the receiver 2.

In the seventh embodiment, the set of frequency intervals composed of all frequency intervals from the most left frequency interval of the M preferred intervals to the most right may optionally include the M preferred frequency intervals. In fact, in this case the average CQI of the set of frequency intervals excluding the M preferred frequency intervals can be obtained from the knowledge of the average CQI of the M preferred frequency intervals.

In the seventh embodiment, the average CQI values may optionally be differentially encoded. That is, the average CQI of one group of frequency intervals may be transmitted as a difference with respect to the average CQI of the other group of frequency intervals.

In an eighth embodiment, the receiver 2 determines a set of size K frequency intervals around the M preferred frequency intervals in the vicinity of the M preferred frequency intervals (each within a specified number of frequency locations of one of the M preferred). The receiver 2 reports only: the frequency locations of the M preferred frequency intervals, and a combined average value of all M+K frequency intervals. The scheduler 14 then has M+K intervals available for scheduling. The reconstruction block 40 reconstructs the CQIs by estimating all M+K intervals to have the same CQI, this being the average transmitted by the receiver 2.

In a ninth embodiment, the receiver 2 determines a set of size K frequency intervals around the M preferred frequency intervals in the vicinity of the M preferred frequency intervals (each within a specified number of frequency locations of one of the preferred M). The receiver 2 reports only: the frequency locations of the M preferred frequency intervals, an average CQI of the M preferred frequency intervals, and a separate average CQI of the K frequency intervals. The scheduler 14 then has M+K intervals available for scheduling. The reconstruction block 40 then reconstructs the CQIs by estimating that the M preferred frequency intervals all have the same CQI, this being the average as reported by the receiver 2; and by estimating that the K other intervals all have the same lesser CQI, as also reported as a separate average by the receiver 2.

In the ninth embodiment, the average CQI values may optionally be differentially encoded. That is, the average CQI of one or more groups may be transmitted as a difference in relation to the average CQI of another group, for example as the gradient between successive groups (this differential is similar to the slope data of the first embodiment, but with respect to groups of frequency intervals instead of individual frequency intervals).

In a tenth embodiment, the receiver 2 reports only: the frequency locations for the M preferred frequency intervals, a combined average of the 3M CQIs of the M preferred frequency intervals and their 2M adjacent frequency intervals, and an extra one bit b. The extra bit b indicates whether more than half of the 3M frequency intervals experience a CQI higher than the average CQI of the 3M frequency intervals, b being positive if more than half of the 3M frequency intervals experience a CQI higher than the average, and negative otherwise. The scheduler then has 3M intervals available for scheduling. The reconstruction block 40 reconstructs the CQIs as CQI CQI_average+b$\Delta$, where $\Delta$ is a correction factor. The factor $\Delta$ could be for example be based on the modulation and coding scheme (MCS) step.

A Modulation and Coding Scheme (MCS) is the mechanism by which the base station selects the modulation and the code rate depending on the channel quality reported by the UE through the Channel Quality Indicator (CQI). The code rate can be selected by changing the encoder rate or by using a fixed-rate code and varying the amount of puncturing on the encoded block. Typically, the higher the channel quality (SIR) the higher the number of bits that can be transmitted to that UE—so for a high value of reported CQI the base station selects a high-order modulation and a higher code rate. This selection is usually done on the basis of a table, that maps a set of quantized CQIs (e.g. corresponding to SIR steps of 1 dB) to a corresponding set of MCSs, each being constituted by one modulation scheme and one puncturing rate (or block size before fixed-rate coding, which indirectly determines the puncturing rate). So $\Delta$ can be for instance be based on the step with which the CQI is quantized in the CQI table (the table that maps each CQI to one MCS).

In an eleventh embodiment, the receiver 2 reports only: the frequency locations for the M preferred frequency intervals, an average of the M CQIs of the M preferred frequency intervals, and one extra bit b. The extra bit b indicates whether more than half of the M frequency intervals experience a CQI higher than the average CQI of the M preferred frequency intervals, b being positive if more than half experience a CQI higher than the average, and negative otherwise. The scheduler then has M intervals available for scheduling. The reconstruction block reconstructs the CQIs as CQI=CQI_average+ b$\Delta$, where $\Delta$ is a correction factor which could again be for example the modulation and coding scheme (MCS) step.

In a twelfth embodiment, the receiver 2 reports frequency locations for the M preferred frequency intervals, a combined average of the 3M CQIs of the M preferred frequency intervals and their 2M adjacent frequency intervals, and one extra bit b. The extra bit b indicates whether the average CQI value of the adjacent frequency intervals is very different from the average CQI of the M preferred frequency intervals (i.e. different by a specified amount). The scheduler 14 then has 3M intervals available for scheduling. Based on the bit b, the reconstruction block 40 can thus decide whether or not to use the reported averaged CQI information for the adjacent frequency intervals.

In a thirteenth embodiment, a plurality of channel quality indicators are determined, each of which corresponds to a respective one of a plurality of frequency intervals. A plurality M of preferred channel quality indicators are then selected, using appropriate criteria. An average of the M preferred channel quality indicators is computed. In addition, an average of the M preferred channel quality indicators and the channel quality indicators of the frequency intervals adjacent to the frequency intervals of the M preferred channel quality indicators is computed. The frequency intervals adjacent to the M preferred channel indicators may be one or more neighbor intervals, i.e., the next interval either side of the interval of a preferred channel quality indicator. The frequency intervals adjacent to the M preferred channel indicators may be one or more intervals in the vicinity interval of a preferred channel quality indicator.

In reporting, the frequency locations of the frequency intervals corresponding to the M preferred channel quality indicators are transmitted. In addition, either (i) a first average being the computed average of the M preferred channel quality indicators; or (ii) a second average being the computed average of the M preferred channel quality indicators and the channel quality indicators of the frequency intervals adjacent to the frequency intervals of the M preferred channel indicators, is transmitted. Further, an indication is transmitted as to which average is transmitted. The indication may be a bit.

The selection as to which is average is sent may be determined in a number of ways. It may be determined from the average slopes between the frequency intervals of the M of preferred channel quality indicators and their adjacent (neighbour) frequency intervals. It may be determined from the variance of the CQI around the frequency intervals of the M preferred channel quality indicators. It may be determined from the difference between the average the M preferred channel quality indicators and the average of the channel quality indicators of the frequency intervals adjacent to those of the M preferred channel indicators. It may also be determined by other means.

Thus in the thirteenth embodiment there is reported either an average of the channel quality indicators of M preferred frequency intervals, or an average of the channel quality indicators of M preferred and adjacent frequency intervals. In addition, preferably one bit is transmitted to report which average is being transmitted.

In a fourteenth embodiment, a plurality of channel quality indicators are determined, each of which corresponds to a respective one of a plurality of frequency intervals. A plurality M of preferred channel quality indicators are then selected, using appropriate criteria. An average of the M preferred channel quality indicators is computed.

In reporting, the frequency locations of the frequency intervals corresponding to the M preferred channel quality indicators are transmitted. The computed average of the M preferred channel quality indicators is also reported. In the transmitter 4, the reported computed average is used by the scheduler 14 to schedule the M preferred frequency intervals (i.e. those frequency intervals corresponding to the M preferred channel quality indicators).

Additionally, an indication is reported as to whether the scheduler should additionally use the computed and reported average to schedule frequency intervals adjacent to the M preferred intervals.

The frequency intervals adjacent to the M preferred channel quality indicators may be one or more neighbor intervals, i.e., the next interval either side of the interval of a preferred channel quality indicator. The frequency intervals adjacent to the M preferred channel indicators may be one or more intervals in the vicinity interval of a preferred channel quality indicator. The frequency intervals adjacent to the frequency interval associated with a preferred channel quality indicator may be any number of frequency intervals either side of the interval. This may be a symmetric or asymmetric number. Thus the adjacent intervals may comprise x intervals on one side and y intervals on the other side, where x and y are either the same or different, and greater than or equal to zero (one of x or y being non-zero).

The indication is preferably a transmitted bit. Whether the identifier (or bit) is set to indicate that the scheduler should use the computed and reported average to schedule frequency intervals adjacent to the M preferred intervals may be achieved in a number of ways. For example, the identifier may be set in dependence on the average slopes between the frequency intervals of the M of preferred channel quality indicators and their adjacent (neighbor) frequency intervals. The bit may be set in dependence on the variance of the CQI around the frequency intervals of the M of preferred channel quality indicators. The bit may be set in dependence on the difference between the average of the M preferred channel quality indicators and the average of the channel quality indicators of the frequency intervals adjacent to (neighbor/in the vicinity of) those of the M preferred channel indicators. The bit may also be set in dependence on other criteria.

Thus in the fourteenth embodiment the average of the M preferred channel quality indicators is reported, together with an instruction as to whether the reported average is to be used to schedule intervals adjacent to the intervals associated with those M preferred values.

In a fifteenth embodiment, a plurality of channel quality indicators are determined, each of which corresponds to a respective one of a plurality of frequency intervals. A plurality M of preferred channel quality indicators are then selected, using appropriate criteria. An average of the M preferred channel quality indicators is computed. In addition, an average of the channel quality indicators of the frequency intervals adjacent to the frequency intervals of the M preferred channel quality indicators is computed. The frequency intervals adjacent to the M preferred channel indicators may be one or more neighbour intervals, i.e., the next interval either side of the interval of a preferred channel quality indicator. The frequency intervals adjacent to the M preferred channel indicators may be one or more intervals in the vicinity interval of a preferred channel quality indicator. In addition, an average of the channel quality indicators of all the frequency intervals of the entire transmission bandwidth is computed.

In reporting, the frequency locations of the frequency intervals corresponding to the M preferred channel quality indicators are transmitted. A first average, being the computed average of the M preferred channel quality indicators, is also reported. In addition, either (i) a second average being the computed average of the channel quality indicators of the frequency intervals adjacent to the frequency intervals of the M preferred channel quality indicators; or (ii) a third average being the computed average of the channel quality indicators of all the frequency intervals of the entire transmission bandwidth, is transmitted. Additionally, an indication is reported indicating whether said average of the frequency intervals adjacent to the frequency intervals of the M preferred channel quality indicators or said average of the channel quality indicators of all the frequency intervals of the entire transmission bandwidth is transmitted. In other words, the indication indicates whether the second or third average is reported with the first average.

The indication is preferably a transmitted bit. The state of the bit indicates whether the second average or third average is transmitted.

The selection as to which is average is sent may be determined in a number of ways. It may be determined from the variance of the CQI around the frequency intervals of the M preferred channel quality indicators. It may be determined from the difference between the second average (average CQI of the frequency intervals adjacent to those of the M preferred channel quality indicators) and the third average (average CQI of all frequency interval of the entire transmission bandwidth). It may also be determined by other means.

Thus in the fifteenth embodiment the average of the M preferred channel quality indicators is reported, together with either an average of the channel quality indicators of adjacent frequency intervals or of all the frequency intervals of the entire transmission bandwidth, plus an instruction as to whether the reported average refers to the intervals adjacent to the intervals associated with the M preferred channel quality indicators or to the entire system bandwidth.

In a sixteenth embodiment, a plurality of channel quality indicators are determined, each of which corresponds to a respective one of a plurality of frequency intervals.

A plurality M of preferred channel quality indicators are then selected, using particular criteria. The criteria is based on a metric associated with each individual frequency interval. Thus for each individual frequency interval, there is provided a metric. The metric for each frequency interval is based on channel quality information for one or more frequency intervals, centred on a specific frequency interval. Preferably the metric is determined to be the average channel quality indicator for a group of frequency intervals including the specific frequency interval for which a metric is being determined.

For example, the metric may be determined, for the $k^{th}$ frequency interval, from a group of $k\pm 1$ frequency intervals. In the preferred example, the metric may be determined as the average channel quality indicator over $k\pm 1$ frequency intervals centred around the $k^{th}$ frequency interval.

An example for computing the appropriate metrics for each frequency interval in this way can be explained further as follows:

for frequency interval 1, assign a metric, computed as the average CQI over the frequency intervals 1 and 2;
for frequency interval 2, assign a metric, computed as the average CQI over the frequency intervals 1, 2 and 3;
for frequency interval 3, assign a metric computed as the average CQI over the frequency intervals 2, 3 and 4;
. . .
for frequency interval k, assign a metric computed as the average CQI over the frequency intervals k−1, k and k+1;
. . .
for frequency interval N (where N is the total number of frequency of intervals), assign a metric, computed as the average CQI over the frequency intervals N−1, and N.

Based on the determined metrics for each frequency interval, the M preferred frequency intervals are selected. In one embodiment, the M best metrics, i.e., the M best computed averages, are selected.

The reporting may be in accordance with any prior known technique or any embodiment described herein. Thus the average of the M preferred channel quality indicators may be reported. The preferred technique for selecting the M preferred channel quality indicators in accordance with the sixteenth embodiment may be implemented in any foregoing embodiment, such as either the thirteenth or fourteenth or fifteenth embodiments. The implementation of a CQI report scheme may thus follow any technique described herein or previously known in the art.

In a seventeenth embodiment, the channel quality information reported may be used by the scheduler 14 in the transmitter for scheduling transmissions in frequency intervals adjacent to the frequency intervals associated with the M preferred channel quality indicators.

In general, the scheduler receives channel quality indicator information for selected frequency intervals. In accordance with the seventeenth embodiment, the scheduler may schedule transmission in at least one other frequency interval in dependence on the channel quality indicator information for a selected frequency interval.

The selected frequency intervals may be the intervals having M preferred channel quality indicator information. The at least one other frequency interval is preferably an interval adjacent to a selected frequency interval.

Thus in all embodiments described herein, and in any prior art embodiment, a further modification—described in accordance with the seventeenth embodiment of the invention—provides for the scheduler at the transmitter to utilize any reported channel quality information for selected frequency intervals to be used in scheduling transmission in another frequency interval, preferably an adjacent frequency interval.

For all embodiments described herein, in a preferred implementation the M preferred frequency intervals are selected in dependence on the M best frequency intervals.

For any embodiment described herein where reference is made to adjacent frequency intervals, the definition of adjacent should be understood as discussed above in respect of the fourteenth embodiment. Where values associated with adjacent frequency intervals are averaged, this may involve averaging some or all values on one side of an interval, some or all values on the other side of the interval, or some or all values on both sides of the interval.

In each described embodiment, there is a series of quantities that are part of the CQI feedback. For example, these quantities may include the locations of the M preferred frequency intervals, and also the average of the M preferred frequency intervals and their 2M adjacent frequency intervals. In all embodiments, the receiver, such as a mobile station or user equipment, may additionally report a 'wideband' CQI average, i.e., the average of all the CQIs of the entire band. The entire band may be the system bandwidth or the bandwidth of operation of the receiver. Thus in any embodiment described, in addition to the transmission of CQI information including averages as described for those embodiments, a further average being the 'wideband' CQI average may be transmitted.

The above described embodiments differ from known schemes by use of information available through the channel correlation, e.g., slopes or averages of adjacent or nearby frequency intervals. The main advantage of reporting the information is to give more opportunities to the scheduler. The additional information on the adjacent or nearby frequency intervals should be seen first as extra redundancy information, since it adds the possibility to schedule the user on another frequency interval. The transmission of this information can also be seen as a compression scheme, since reporting the variation of the CQI value and the index of the adjacent frequency or nearby intervals requires less bits than reporting the actual individual CQIs.

The proposed CQI feedback scheme has the following advantages:

Increases the multi-user diversity gain, by giving more scheduling opportunities.

Reduces user collisions, by providing more scheduling opportunities and more information about the channel.

Reduces the signalling overhead, especially in the case of Multiple-Input Multiple-Output (MIMO) transmission systems.

Enables better channel tracking, since it provides more information. This could be used to reduce the signalling overhead in the time domain (through a longer time period of CQI reports).

The invention also has application in a MIMO transmission scheme, where a CQI per spatial stream needs to be reported. Thus, the CQI feedback scheme described in this invention could be used in order to exploit the spatial correlation of the channel and hence further reduce the CQI signalling overhead. This reduction in overhead is even more beneficial for systems with high number of antennas and number of users.

What is claimed is:

1. A method of transmitting channel quality data for channels in a wireless communication system, the method comprising:

determining a plurality of metrics, each based on channel quality information of a respective one of a plurality of frequency intervals at respective frequency locations within the channel;

selecting a subset M of said plurality of frequency intervals based on said metrics;

determining M exclusive groups of K+1 frequency intervals, each group consisting of a respective one of said M frequency intervals and K frequency intervals immediately around the respective one of the M frequency intervals, wherein K is based on an estimate of correlation between frequency intervals;

transmitting the frequency locations of the M frequency intervals; and transmitting the same channel quality indicator for the M groups of K+1 frequency intervals.

2. The method of claim 1, wherein K is pre-selected based on a predetermined estimate of correlation between frequency intervals.

3. A method of claim 2, wherein the method comprises the steps of determining said predetermined estimate of correlation between frequency intervals at system design, and pre-selecting K in dependence on said correlation.

4. A method of claim 1, comprising deriving an estimate of the correlation between frequency intervals based on channel conditions, and selecting K in dependence on said correlation.

5. The method of claim 1, wherein said estimate is an estimate of a correlation of the channel quality indicators between frequency intervals.

6. A method according to claim 1, further comprising:

transmitting an indicator indicating whether the transmitted channel quality information is to be used for scheduling frequency intervals adjacent to said M frequency intervals.

7. A method according to claim 1, wherein the selected frequency intervals are the M preferred intervals based on a selection criterion.

8. A method according to claim 7, wherein the selection criterion comprises the selection of M frequency intervals having the highest channel quality indicator values.

9. A method according to claim 1, further comprising transmitting averaged channel quality indicator information for the system bandwidth or for the bandwidth of operation.

10. A method according to claim 9, comprising:

differentially encoding said same channel quality indicator information relative to said averaged channel quality indicator information for the system bandwidth or for the bandwidth of operation; and transmitting said same channel quality indicator information in differentially encoded form.

11. A user equipment comprising:

a receiver for receiving an incoming channel in wireless communication system;

a computation block arranged to determine a plurality of metrics, each based on channel quality information of a respective one of a plurality of frequency intervals at respective frequency locations within the channel;

a selection block arranged to select a subset M of said plurality of frequency intervals based on said metrics and determine M exclusive groups of K+1 frequency intervals, each group consisting of a respective one of said M frequency intervals and K frequency intervals immediately around the respective one of the M frequency intervals, wherein K is based on an estimate of correlation between frequency intervals;

a transmitter arranged to transmit the frequency locations of the M frequency intervals, and to transmit the same channel quality indicator for the M groups of K+1 frequency intervals.

12. The user equipment of claim 11, wherein the K is pre-selected based on a predetermined estimate of correlation between frequency intervals.

13. The user equipment of claim 11, wherein the selection block is arranged to provide an estimate of the correlation between frequency intervals based on channel conditions, and select K in dependence on said correlation.

14. The user equipment of claim 11, wherein said estimate is an estimate of a correlation of the channel quality indicators between frequency intervals.

15. The user equipment of claim 11, wherein:

the transmitter is further arranged to transmit an indicator indicating whether the transmitted channel quality information is to be used for scheduling frequency intervals adjacent to said M frequency interval.

16. The user equipment of claim 11, wherein the selection block is arranged to select, as said selected frequency intervals, M preferred intervals based on a selection criterion.

17. The user equipment of claim 16, wherein the selection criterion comprises the selection of M frequency intervals having the highest channel quality indicator values.

18. The user equipment of claim 11, wherein the transmitter is further arranged to transmit averaged channel quality indicator information for the system bandwidth or for the bandwidth of operation.

19. The user equipment of claim 18, wherein:

the computation block is arranged to differentially encode said same channel quality indicator information relative to said averaged channel quality indicator information for the system bandwidth or for the bandwidth of operation; and the transmitter is arranged to transmit said same channel quality indicator information in differentially encoded form.

20. A method of transmitting channel quality data for channels in a wireless communication system, the method comprising:
- determining a plurality of metrics, each based on channel quality information of a respective one of a plurality of frequency intervals at respective frequency locations within the channel;
- based on the metrics, selecting a subset M of said plurality of frequency intervals;
- determining M exclusive groups of K+1 frequency intervals, each group consisting of a respective one of the M frequency intervals and K frequency intervals immediately around the respective one of the M frequency intervals, wherein K is based on an estimate of correlation between frequency intervals;
- transmitting the frequency locations of the M channel quality indicators; and
- transmitting M channel quality indicators, each being transmitted so as to report the same channel quality indicator for the K+1 frequency intervals of a respective one of said M groups.

21. A method according to claim 20, comprising differentially encoding the channel quality indicator of one or more of said groups relative to the channel quality indicator of another of said groups; wherein the one or more channel quality indicators of said one or more groups are transmitted in differentially encoded form.

22. The method of claim 20, wherein K is pre-selected based on a predetermined estimate of correlation between frequency intervals.

23. The method of claim 22, wherein the method comprises the steps of determining said predetermined estimate of correlation between frequency intervals at system design, and pre-selecting K in dependence on said correlation.

24. A method of claim 20, comprising deriving an estimate of the correlation between frequency intervals based on channel conditions, and selecting K in dependence on said correlation.

25. The method of claim 20, wherein said estimate is an estimate of a correlation of the channel quality indicators between frequency intervals.

26. The method of claim 20, further comprising:
- transmitting an indicator indicating whether the transmitted channel quality information is to be used for scheduling frequency intervals adjacent to said M frequency intervals.

27. The method of claim 20, wherein the selected frequency intervals are the M preferred intervals based on a selection criterion.

28. The method of claim 27, wherein the selection criterion comprises the selection of M frequency intervals having the highest channel quality indicator values.

29. The method of claim 20, further comprising transmitting averaged channel quality indicator information for the system bandwidth or for the bandwidth of operation.

30. The method of claim 29, comprising:
- differentially encoding said same channel quality indicator information for each group relative to said averaged channel quality indicator information for the system bandwidth or for the bandwidth of operation; and
- transmitting said same channel quality indicator information for each group in differentially encoded form.

31. A user equipment comprising:
- a receiver for receiving an incoming channel in a wireless communication system;
- a computation block arranged to determine a plurality of metrics, each based on channel quality information of a respective one of a plurality of frequency intervals at respective frequency locations within the channel;
- a selection block arranged to select a subset M of said plurality of frequency intervals based on the metrics, and to determine M exclusive groups of K+1 frequency intervals, each group consisting of a respective one of the M frequency intervals and K frequency intervals immediately around the respective one of the M frequency intervals, wherein K is based on an estimate of correlation between frequency intervals;
- a transmitter arranged to transmit the frequency locations of the M preferred channel quality indicators, and to transmit M channel quality indicators, each being transmitted so as to report the same channel quality indicator for the K+1 frequency intervals of a respective one of said M groups.

32. The user equipment of claim 31, wherein;
- the computation block is arranged to differentially encode the channel quality indicator of one or more of said groups relative to the channel quality indicator of another of said groups; and
- the transmitter is arranged to transmit the one or more channel quality indicators of said one or more groups are transmitted in differentially encoded form.

33. The user equipment of claim 31, wherein the K is pre-selected based on a predetermined estimate of correlation between frequency intervals.

34. The user equipment of claim 31, wherein the selection block is arranged to provide an estimate of the correlation between frequency intervals based on channel conditions, and select K in dependence on said correlation.

35. The user equipment of claim 31, wherein said estimate is an estimate of a correlation of the channel quality indicators between frequency intervals.

36. The user equipment of claim 31, wherein:
- the transmitter is further arranged to transmit an indicator indicating whether the transmitted channel quality information is to be used for scheduling frequency intervals adjacent to said M frequency intervals.

37. The user equipment of claim 31, wherein the selection block is arranged to select, as said selected frequency intervals, M preferred intervals based on a selection criterion.

38. The user equipment of claim 37, wherein the selection criterion comprises the selection of M frequency intervals having the highest channel quality indicator values.

39. The user equipment of claim 31, wherein the transmitter is further arranged to transmit averaged channel quality indicator information for the system bandwidth or for the bandwidth of operation.

40. The user equipment of claim 39, wherein:
- the computation block is arranged to differentially encode said same channel quality indicator information for each group relative to said averaged channel quality indicator information for the system bandwidth or for the bandwidth of operation; and
- the transmitter is arranged to transmit said same channel quality indicator information for each group in differentially encoded form.

41. A computer program product for transmitting channel quality data for channels in a wireless communication system, the computer program product comprising code being embodied on a non-transitory computer-readable medium and configured so as when executed on a user equipment to perform operations of:

determining a plurality of metrics, each based on channel quality information of a respective one of a plurality of frequency intervals at respective frequency locations within the channel;

selecting a subset M of said plurality of frequency intervals based on said metrics;

determining M exclusive groups of K+1 frequency intervals, each group consisting of a respective one of the M frequency intervals and K frequency intervals immediately around the respective one of the M frequency intervals, wherein K is based on an estimate of correlation between frequency intervals;

transmitting the frequency locations of the M frequency intervals; and transmitting the same channel quality indicator for the M groups of K+1 frequency intervals.

42. A computer program product for transmitting channel quality data for channels in a wireless communication system, the computer program product comprising code being embodied on a non-transitory computer-readable medium and configured so as when executed on a user equipment to perform operations of:

determining a plurality of metrics, each based on channel quality information of a respective one of a plurality of frequency intervals at respective frequency locations within the channel;

based on the metrics, selecting a subset M of said plurality of frequency intervals;

determining M exclusive groups of K+1 frequency intervals, each group consisting of a respective one of the M frequency intervals and K frequency intervals immediately around the respective one of the M frequency intervals, wherein K is based on an estimate of correlation between frequency intervals;

transmitting the frequency locations of the M channel quality indicators; and transmitting M channel quality indicators, each being transmitted so as to report the same channel quality indicator for the K+1 frequency intervals of a respective one of said M groups.

* * * * *